Jan. 15, 1963  Z. R. MOCARSKI  3,073,310
SURGICAL INSTRUMENT POSITIONING DEVICE
Filed Aug. 5, 1957  2 Sheets-Sheet 2
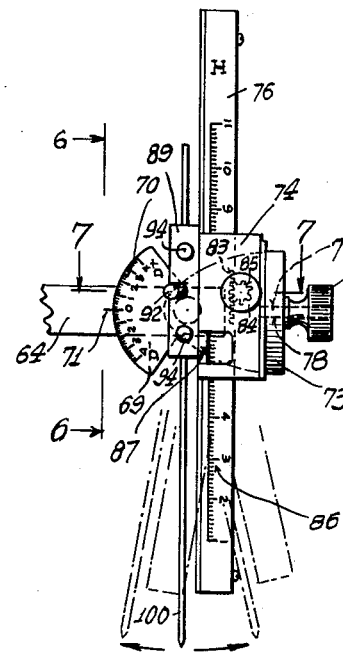
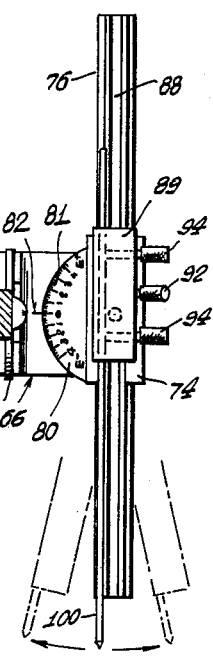
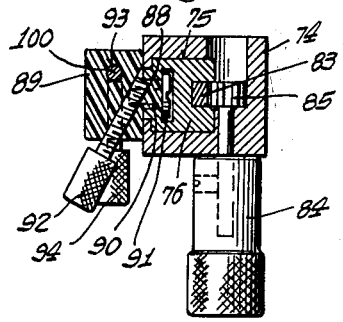
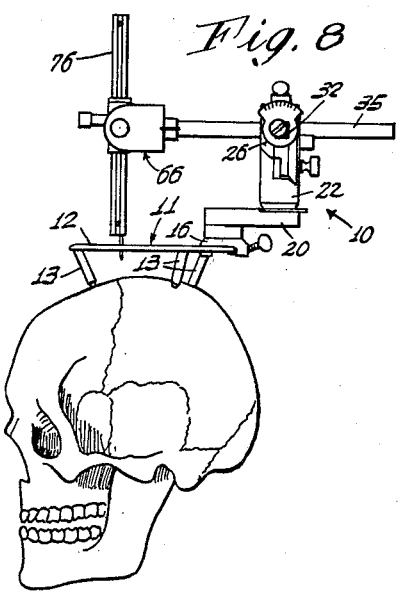
| BASE | A | B | C | D | E | F | G | H |
|---|---|---|---|---|---|---|---|---|
| 1 | 0° | +2° | +8° | 0° | +5° | 3cm. | 4.5cm. | 5cm. |
INVENTOR.
Zenon R. Mocarski
BY
Johnson and Kline
ATTORNEYS

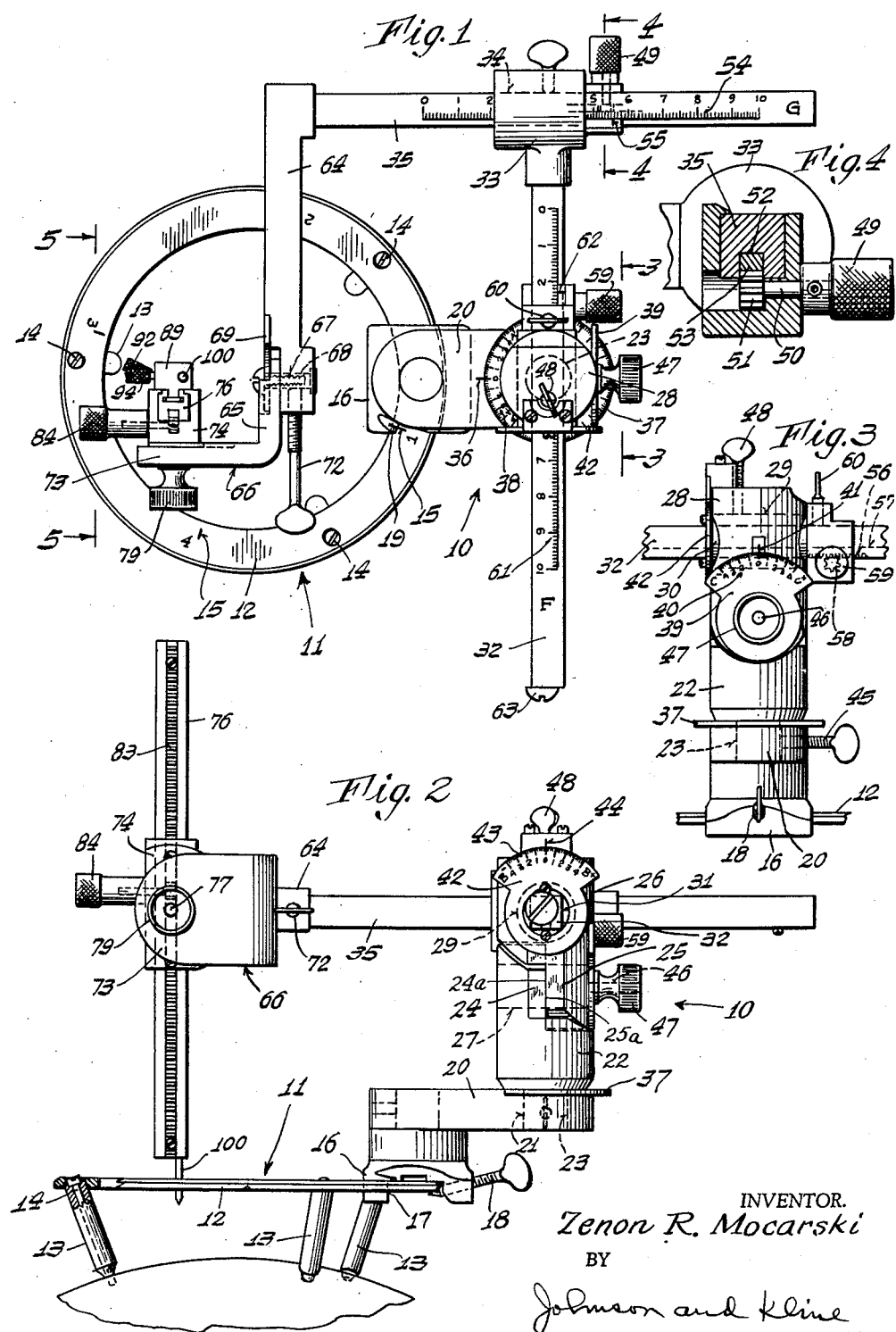

United States Patent Office 3,073,310
Patented Jan. 15, 1963

3,073,310
SURGICAL INSTRUMENT POSITIONING DEVICE
Zenon R. Mocarski, 1329 Kossuth St., Bridgeport, Conn.
Filed Aug. 5, 1957, Ser. No. 676,311
4 Claims. (Cl. 128—303)

The present invention relates to a device for positioning a surgical instrument and more particularly to such a device which is utilized to position the instrument with accuracy and precision within a bone covered inaccessible location, such as a skull.

Normally in brain surgery and/or examinations, it is required to position the working end of a surgical instrument at a small location within a skull. The location is generally determinable by means of X-ray photographs but difficulty in actually locating the instrument at a selected spot has heretofore been experienced. This difficulty is attributed to the prior unsatisfactory and errorful manner of correlating linear distances and angles in the X-ray photographs to movement and angularity of the device holding the instrument. In addition, the insertion of the instrument to the locality has also presented problems because of the necessity of avoiding critical areas of the brain where damage would be serious or even fatal. Thus, while a safe inserting path of the instrument could be determined on the X-ray photographs, the prior devices were incapable of being set so that the instrument would accurately and precisely follow the path.

An object of the present invention is to provide a device in which a surgical instrument may be accurately positioned at the predetermined location in a skull.

A further object is to provide such a device in which the instrument may be inserted with accuracy and precision in the brain along a selected safe path.

Another object is to provide a device in which, after initially positioning the surgical instrument at the desired location, it may be subsequently repositioned at the same location quickly and easily.

In carrying out the present invention the device of the present invention is so constructed that the position of the surgical instrument can be easily correlated to distances and angles which are measurable on X-ray photographs. With each skull it is necessary to have a fixed reference plane from which distances and angles may be measured. An accepted plane is one which contains a line connecting the lowest points of the two eye openings (eye-eye-line) and a line connecting the lowest point of one eye and the lowest point of its associate ear opening (eye-ear line). These two lines determine a plane which is hereinafter referred to as a plane of a skull or reference plane.

The present invention provides a base which is attachable to a skull. Mounted on the base is a pair of rods extending at right angles to each other and interconnecting the base and the two rods are means which provide for setting the two rods in a plane on the person's skull which is parallel to the reference plane of the skull. Each of the rods is individually movable along its longitudinal axis and hence act as coordinates on a graph for positioning the instrument. One end of one of the two rods has attached thereto an instrument holder which is itself pivotable along two axes and longitudinally movable on the rod. The movements of the instrument holder and the rods are capable of being measured by means of indexes and graduated scales provided on relatively movable adjacent parts. Accordingly measurements on the X-ray photographs can be directly correlated to movement, both linear and angular, of the surgical instrument holder without error being introduced by the planes of the rods and skull not being parallel. In addition, the graduations, when recorded, permit a resetting of the instrument to the identical position at a later date when further treatment of the same area is required.

Other features and advantages will hereinafter appear.

In the drawing:

FIGURE 1 is a plan of the surgical instrument positioning device of the present invention.

FIG. 2 is an elevation of FIG. 1.

FIG. 3 is a partial view taken on the line 3—3 of FIG. 1.

FIG. 4 is a cross-sectional view taken on the line 4—4 of FIG. 1.

FIG. 5 is an elevation of the instrument holding portion of the device.

FIG. 6 is a view taken on the line 6—6 of FIG. 5.

FIG. 7 is a section taken on the line 7—7 of FIG. 5.

FIG. 8 is an elevation showing the device fastened to a skull.

FIG. 9 is a sample record required to permit resetting the device to have the instrument again repositioned in the same location within a skull.

Referring to the drawing, FIGS. 1, 2 and 8, the surgical instrument positioning device of the instant invention is generally indicated by the reference numeral 10 and has a base 11. The base includes a flat annular ring 12, though other shapes may be used instead, and has three downwardly extending support legs 13 secured thereto. The legs are tubular and a screw 14 passes through each leg and has a portion which projects beyond the leg to be threaded into the skull to hold the base fast on the skull. Preferably the projecting ends of the screws have self-tapping threads. As shown in FIG. 1, the legs 13 are unevenly spaced about the periphery of the ring 12 for a reason which will be hereinafter apparent. The top surface of the annular ring has indicating marks 15 for enabling the accurate positioning of the rest of the device thereon. The ring 12 is capable of being attached anywhere on the skull which is capable of providing a threaded hole for the screws.

According to the present invention, the instrument holder is constructed to permit the instrument to be first positioned in a plane parallel to the reference plane of the skull and then to be movable along determinable coordinates within the plane. To this end, as shown in FIGS. 1 and 2, the device 10 has a clamping member 16 which has a groove 17 into which the annular ring 12 fits. A thumbscrew 18 threads through the clamping member for locking the clamping member to the ring 12. While the clamping member may be attached at any location on the ring, to aid in fastening it accurately at known positions, the clamping member has an index mark 19 for cooperation with indicating marks 15.

Secured to the clamping member 16 is a laterally extending arm 20 which has an aperture 21 formed in its remote end portion. A post 22 has its lower end 23 positioned within the aperture 21 for pivotal movement with respect thereto. The upper end 24 of the post 22 is step-shaped to provide a vertical surface 24a for cooperation with a step-shaped lower end portion 25 of a second post 26 which provides a mating vertical surface 25a. A horizontal pivot shaft 27 extends through the aligned vertical surfaces of the stepped end portions of the posts for enabling pivotal movement of the second post 26 with respect to the first post 22.

The upper end 28 of the second post 26 has an aperture 29 extending therethrough in which is mounted a bushing 30 having a rectangular longitudinal bore 31. Within the bore 31 there is slidably mounted a first rod 32 which at one end has attached thereto a T connector 33 The connector 33 has a rectangular bore 34 extending at right angles to the axis of the rod 32 and slidably mounted within the bore 34 is a second rod 35.

The two rods 32 and 35 are thus fixed with respect to each other so that their longitudinal axes extend at right angles to each other and define the plane of the device 10 which is adapted to be positioned on a skull parallel to the reference plane of the skull.

It will be appreciated by the above construction that the bushing 30 permits rotation of the rods 32 and 35 about an axis which is parallel to the length of the rod 32 and transverse to the rod 35 while the pivot shaft 27 permits rotation of the rods about an axis which is parallel to the length of the rod 35 and transverse to the rod 32. Thus the two rods are always maintained perpendicular to each other and as a unit are pivotable about two axes which are also perpendicular. The pivoted connection between the lower end 23 of the post 22 and the arm 20 provides for rotation of the rods and associated pivots about an axis which is perpendicular to the plane of the flat ring 12 to enable initial centering of the rods on the skull. Accordingly the plane of the two rods is capable of being adjusted parallel to the plane of the skull.

In order to accurately initially position the two rods and to enable the subsequent resetting of the position, each of the above recited three pivotal connections is provided with an arcuate scale and a cooperating index mark or pointer. To this end, the arm 20 has a pointer 36, while attached to the lower end 23 of the post 22 is a circular plate 37 having degree graduations 38. The pivot shaft 27 fastened to the post 22 carries a plate 39 having degree graduations 40 while the second post 26 has an index mark 41 cooperating therewith. The bushing 30 is rotatable with respect to the post 26 and carries a plate 42 which has degree graduations 43 while the upper end 28 of the post 26 has an index mark 44.

After the elements have been positioned, to prevent accidental or otherwise movement thereof, there is provided locking means for each of the pivots. Thus, a thumbscrew 45 extends through a threaded bore in the arm 20 to engage and lock the lower end 23 of the post 22. The pivot shaft 27 has a projecting threaded end portion 46 on which is threaded a knob 47 which clamps the two posts 22 and 26 in the desired angular position. Additionally another thumbscrew 48 extends through a threaded bore in the upper end 28 of the post 26 to engage the bushing 30 and lock it in position.

Once the parallel plane of the rods 32 and 35 has been set, the instrument has to be capable of being accurately moved within the said plane known distances to the predetermined desired position. This is accomplished according to the present invention by providing for lengthwise movement of each rod. Thus, the rod 35 has a knob 49 which is attached to a shaft 50 (see FIG. 4) to rotate a small pinion gear 51. The bottom surface of the rod 35 has a groove 52 formed therein in which a segment of a rack 53 is fastened for mating with a gear 51 so that rotation of the knob 47 will cause rotation of the pinion and hence longitudinal movement of the rack 53 and rod 35. The distance which each rod moves is, according to the present invention, measurable and known and for this purpose the rod 35 carries a linear scale 54 for cooperation with an index mark 55 on the connector 33. Similarly, the rod 32 is provided with a rack 56 positioned in a groove 57 formed in its bottom surface for cooperation with a pinion 58 rotatable by a knob 59 for longitudinally moving the rod 32. A thumbscrew 60 passes through the bushing 30 for locking the rod 32 at the selected position. Additionally the rod 32 is provided with a linear scale 61 cooperating with an index mark 62 carried by the bushing 30. A stop 63 is attached to the end of the rod 32 remote from the rod 35 to limit the movement of the rod 32 in one direction while movement in the other direction is limited by the connector 33.

While a surgical instrument 100 may be attached directly to an end of the rod 35, according to the present invention there is attached to an end of the rod 35 an arm 64 extending at right angles from the rod and parallel to the rod 32. The other end of the arm 64 is pivotally connected to one leg 65 of a right-angle bracket 66 by a screw 67 threaded in a headed bushing 68. The leg 65 carries a plate 69 having degree graduations 70 which cooperate with an index mark 71 on the arm 64. A thumbscrew 72 engages the bushing 68 to lock the leg and arm at the desired angular position. The other leg 73 of the bracket 66 has pivotally mounted thereon an elongate channel member 74 having a rectangular groove 75 into which a bar 76 is slidably mounted. The channel member 74 has a shaft 77 attached thereto which passes through an aperture 78 in the leg 73 for providing pivotal movement therebetween, while a thumbnut 79 locks the parts in a desired position. Also attached to the channel member 74 is a plate 80 having degree graduations 81 for cooperation with an index mark 82 on the leg 73.

The bar 76 is mounted for longitudinal movement in the channel 74 and has on its underside a rack 83 and a knob 84 operates a pinion 85 for causing longitudinal movement of the bar 76. Additionally the bar 76 carries a linear scale 86 for cooperation with an index mark 87 carried by the channel 74. The surface of the bar 76 opposite the rack 83 is provided with a longitudinal extending T-shaped slot 88 for slidably holding a surgical instrument holder 89 having a longitudinal flange 90 and a screw head 91 positioned in the T slot. The holder 89, in addition, has a locking screw 92 threaded in the holder and has its end engageable with the edge of the slot 88 to lock the holder 89 at the desired location on the bar 76 to the slot. Additionally the holder has a longitudinally extending aperture 93 adapted to slidably receive a surgical instrument 100. In the specific embodiment shown, a pointed needle or probe is shown and a pair of thumbscrews 94 lock the instrument to the holder 89. It will be apparent that other surgical instruments are intended to be utilized in addition to the needle and that the holder may have an aperture and/or other well-known mechanical expedients which enables the clamping of the instrument thereto.

From the above structure it will be appreciated that the instrument holder 89 moves with the rods 32 and 35. In addition, the pivotal connections between the arm 64 and leg 65 provide for pivotal movement about an axis parallel to the rod 35 while the connection between leg 73 and the channel member 74 provides for a second pivotal movement of the holder 89 about an axis at right angles to the first. The holder 89 is capable of being adjustably set on the bar 76 while the bar is capable of being longitudinally moved.

In use, the base 11, separated from the other parts, is fastened to the skull by the self-tapping screws 14 so that the annular ring 12 preferably circumscribes the area of the skull to be pierced. The clamping member 16 with the parts which it carries is then fastened to the ring 12 and the two rods 32 and 35 are approximately positioned so that they are in a plane parallel to the plane of the skull. Then the rods are pivoted about the posts 22 and 27 so that one of the rods becomes parallel with the eye-eye line or the eye-ear line of the skull. The two pivots 67 and 77 are locked at zero which places the instrument holder at right angles to the plane of the rods. X-ray photographs are then taken forwardly and sidewise and they will show the deviation of the two rods 32 and 35 from the skull lines. The two rods are then adjusted by measuring the angular deviation in the photographs by rotating the rods about pivot 27 and bushing 30 the amount of the deviation. This aligns the plane of the rods with the plane of the skull. The photographs will also show the end of the surgical instrument 100 and the place within the skull to be contacted. Then linear measurements are taken on the front view photograph for the sidewise distance between the end of the instrument and the selected area and on the side view for the frontal distance between the end of the instrument and the said area. The rods 32 and 35 are then longitudinally moved their respective distances by their knobs 59 and 49 respectively to position the end of the instrument 100 vertically over the location. The depth of the location is easily measured from the photographs and if the bar 76 and instrument 100 are vertical, the bar 76 can be moved inwardly the required depth which will position the end of the instrument precisely at the desired location within the skull.

It will be appreciated that by having the two rods in a plane parallel to the plane of the skull (the photographs are taken perpendicular to the skull plane), that any linear distance measured in the photographs between the instrument and the selected area is the distance that the rods should be moved to align the instrument with a point on the photographs and there will be no deviation due to linear distances along unparallel planes.

While the above describes inserting the instrument to the desired location by movement thereof perpendicular to the plane of the skull, it is generally required that the instrument be inserted at an angle in order to avoid injury to critical portions of the brain. This is easily accomplished by the device of the instant invention by using the two pivots 67 and 77 to adjust the instrument holder. The taking of the front and side X-ray photographs as mentioned above is initially done. Then the path to be traveled by the instrument is determined on the photographs and the angles, both front and side, are measured and set on the scales 70 and 81. The two rods are then longitudinally moved until the instrument end is on the point of the skull which corresponds to the intersection between the path of the instrument and the skull in the photographs. The instrument is then inserted the required depth by movement of the bar 76 according to the scale 86 on the bar 76.

The above relates to initially positioning the working end of an instrument at the desired location within the skull. Normally, in addition to the first positioning thereof, it is generally necessary at a later date to again position the instrument end at the same location. This is easily and quickly accomplished by the present invention without going through the initial positioning procedure above recited. With the instrument end at the desired location during the initial positioning, readings of the various scales are taken and recorded on a record sheet such as is shown in FIG. 9. Thus "Base" indicates the particular reading of indicating mark 15 on the ring 12; "A" the reading on graduation 38; "B," the reading on graduation 43; "C," the reading on graduation 40; "D," the reading on graduation 70; "E," the reading on graduation 81; "F," the reading on the linear scale of rod 32; "G," the linear reading of rod 35; and "H," the linear reading on the bar 76. Accordingly, the base is repositioned on the skull with the screws in the same holes (since they are off center the base can be mounted only in one position) and the various settings made except for the bar. Then the bar is moved the required distance to reposition the end of the instrument in the same position.

It will accordingly be appreciated that there has been illustrated and described a device which may be easily attached on a skull, which permits the location of a surgical instrument within the skull with a minimum of effort and with accuracy and precision, and which is capable of quickly and easily being repositioned at the same location from time to time for a series of operations or treatments without requiring any X-rays or other positioning medium or measurement; the base being additionally secured to the skull by the same screws using the same holes in the skull.

Variations and modifications may be made within the scope of the claims and portions of the improvements may be used without others.

I claim:

1. A device for accurately positioning a surgical instrument within a skull comprising a holder for the instrument, a pair of elongate rods mounted at right angles to each other and defining a plane, means mounting the holder on one of the rods, a base consisting of a flat ring and at least three legs attached thereto and extending downwardly therefrom and a threadable member projectable into the skull for fastening the ring thereto, a pair of pivots having axes extending at right angles to each other and connected to the other rod, and clamp means interconnecting the pivots and the base.

2. A device for accurately positioning a surgical instrument within a skull comprising a holder for the instrument, a pair of elongate rods mounted at right angles to each other and defining a plane, means mounting the holder on one of the rods, a base including a flat ring fastenable to the skull, and means interconnecting the rods and the base for providing pivotal movement of the rods about a pair of axes, each axis being transverse of a rod, whereby the rods may be positioned in a plane which is parallel to the plane of the skull, said interconnecting means including a member formed with a groove into which any portion of the ring fits and having a locking screw for locking the member at the desired position on the ring.

3. A device for accurately positioning a surgical instrument within a skull comprising a base consisting of a flat ring having at least three tubular legs attached thereto and extending downwardly therefrom and unevenly spaced about the ring; a threadable member extending through each leg and projecting therebeyond for threading into a skull to fasten the base thereto; a clamp member formed with a groove into which any peripheral portion of the ring fits and having a locking screw for locking the member at the desired position on the ring; an arm connected to the clamp member and having an aperture; a post pivotally mounted in the aperture and having its pivot axis perpendicular to the flat plane of the ring; a second post pivotally connected to an end portion of the first leg with the pivot axis being perpendicular to the just mentioned axis; a bushing carried by the second leg and pivotally with respect thereto; a rod slidably mounted in the bushing for pivotal movement therewith and longitudinal movement with respect thereto; a T connector connected to an end of the rod and having an elongate aperture extending perpendicular to the rod; a second rod slidably mounted in the elongate aperture for longitudinal movement with respect thereto; an arm fastened to an end of the second rod; an L-shaped member; a pivot interconnecting one end of the arm and a leg of the L-shaped member; a channel member pivotally mounted on the other leg of the L-shaped member; a bar slidably mounted for longitudinal movement in the channel and having a longitudinal groove; and an instrument holder mounted on the bar for adjustable positioning along the groove and for movement with the bar.

4. A device for accurately positioning a surgical instrument within a skull comprising a holder for the instrument, a pair of elongate rods mounted at right angles to each other and defining a plane, means mounting the holder on one of the rods, a base consisting of a flat ring and at least three legs attached thereto and extending downwardly and a threadable member projectable into the skull for fastening the ring thereto, means interconnecting the rods and the base for providing pivotal movement of the rods about a pair of axes, each axis being transverse of a rod, whereby the rods may be positioned in a plane which is parallel to the plane of the skull, in which each leg is tubular, in which a threadable member extends through each leg and projects therebeyond and in which the legs are unequally spaced about the ring, whereby the base is capable of being repositioned on the skull in the same former location.

(References on following page)

References Cited in the file of this patent

UNITED STATES PATENTS

| | | |
|---|---|---|
| 733,321 | Griswold | July 7, 1903 |
| 1,526,619 | Williams | Feb. 17, 1925 |
| 1,920,839 | Cattaneo | Aug. 1, 1933 |
| 2,095,059 | Donnelly | Oct. 5, 1937 |
| 2,401,548 | Chapman | June 4, 1946 |
| 2,494,792 | Bloom | Jan. 17, 1950 |
| 2,775,040 | Leff | Dec. 25, 1956 |

FOREIGN PATENTS

| | | |
|---|---|---|
| 915,666 | Germany | July 26, 1954 |
| 938,129 | France | Sept. 6, 1948 |